US012708960B2

(12) United States Patent
Muto et al.

(10) Patent No.: US 12,708,960 B2
(45) Date of Patent: Aug. 18, 2026

(54) MANUFACTURING METHOD OF TAILORED BLANK AND MANUFACTURING METHOD OF AUTOMOBILE PART

(71) Applicant: FUTABA INDUSTRIAL CO., LTD., Okazaki (JP)

(72) Inventors: Shota Muto, Okazaki (JP); Shinya Azuchi, Okazaki (JP); Koji Yamaguchi, Okazaki (JP)

(73) Assignee: FUTABA INDUSTRIAL CO., LTD., Okazaki (JP)

( * ) Notice: Subject to any disclaimer, the term of this patent is extended or adjusted under 35 U.S.C. 154(b) by 461 days.

(21) Appl. No.: 17/851,355

(22) Filed: Jun. 28, 2022

(65) Prior Publication Data

US 2023/0001510 A1 Jan. 5, 2023

(30) Foreign Application Priority Data

Jul. 1, 2021 (JP) ................................ 2021-110158

(51) Int. Cl.
*B23K 26/26* (2014.01)
*B23K 101/18* (2006.01)
*B23K 103/04* (2006.01)

(52) U.S. Cl.
CPC ........ *B23K 26/26* (2013.01); *B23K 2101/185* (2018.08); *B23K 2103/04* (2018.08)

(58) Field of Classification Search
CPC .......... B23K 2101/16; B23K 2101/185; B23K 2103/04; B23K 26/0626; B23K 26/0734; B23K 26/26
See application file for complete search history.

(56) References Cited

U.S. PATENT DOCUMENTS

2012/0187099 A1* 7/2012 Gubler ............... B23K 26/0608 219/121.75
2012/0256563 A1* 10/2012 Tsubota ............ B23K 26/0626 315/501
2018/0088357 A1 3/2018 Kliner et al.
2019/0076960 A1 3/2019 Yamaguchi
(Continued)

FOREIGN PATENT DOCUMENTS

JP 2019051535 A 4/2019
WO WO-2013135847 A1 * 9/2013 .......... B23K 26/211
WO 2017115974 A1 7/2017

OTHER PUBLICATIONS

Decision of Refusal for Japanese Patent Application No. 2021110158, mailed Sep. 5, 2023, 9 pages.
(Continued)

*Primary Examiner* — Woody A Lee, Jr.
*Assistant Examiner* — Abigail H Rhue
(74) *Attorney, Agent, or Firm* — Withrow + Terranova, PLLC; Vincent K. Gustafson

(57) ABSTRACT

In a manufacturing method of a tailored blank including a first steel plate and a second steel plate to be joined by butt welding, the first and second steel plates are butt welded with a laser beam. The laser beam has a power density q1 in a first region, a power density q2 in a second region, a power density q3 in a third region, and a power density q4 in a fourth region. The power density q1, the power density q2, the power density q3, and the power density q4 satisfy a relationship of q1>q2>q3>q4.

5 Claims, 11 Drawing Sheets

(56) References Cited

U.S. PATENT DOCUMENTS

2021/0060702 A1* 3/2021 Telenko, Jr. ........... B23K 26/14

OTHER PUBLICATIONS

Notice of Reasons for Refusal for Japanese Patent Application No. 2021110158, mailed Apr. 25, 2023, 6 pages.
First Office Action for Chinese Patent Application No. 202210776440.0, mailed Sep. 27, 2024, 14 pages.
Second Office Action for Chinese Patent Application No. 202210776440.0, mailed Feb. 25, 2025, 14 pages.
Notice of Reasons for Rejection for Chinese Patent Application No. 202210776440.0 mailed Jun. 24, 2025, 15 pages.

* cited by examiner

<table>
<tr><td rowspan="2">WITH THREE REGIONS</td><td>FIRST REGION</td><td colspan="2">SECOND REGION</td><td>THIRD REGION</td></tr>
<tr><td>TO ACHIEVE DESIRED PENETRATION DEPTH</td><td colspan="2">TO ASSIST PENETRATION<br>TO STABILIZE KEY HOLE<br>TO ACHIEVE DESIRED MOLTEN WIDTH</td><td>TO PROVIDE SUFFICIENT AMOUNT OF MOLTEN METAL<br>TO ASSIST ACHIEVING OF DESIRED MOLTEN WIDTH</td></tr>
<tr><td rowspan="2">WITH FOUR REGIONS</td><td>FIRST REGION</td><td>SECOND REGION</td><td>THIRD REGION</td><td>FOURTH REGION</td></tr>
<tr><td>TO ACHIEVE DESIRED PENETRATION DEPTH</td><td>TO ASSIST PENETRATION<br>TO STABILIZE KEY HOLE</td><td>TO ACHIEVE DESIRED MOLTEN WIDTH</td><td>TO PROVIDE SUFFICIENT AMOUNT OF MOLTEN METAL</td></tr>
</table>

MANUFACTURING METHOD OF TAILORED BLANK AND MANUFACTURING METHOD OF AUTOMOBILE PART

CROSS-REFERENCE TO RELATED APPLICATION

The present application claims the benefit of Japanese Patent Application No. 2021-110158 filed on Jul. 1, 2021 with the Japan Patent Office, the entire disclosure of which is incorporated herein by reference.

BACKGROUND

The present disclosure relates to a manufacturing method of a tailored blank and a manufacturing method of an automobile part.

There has been known laser welding in which components are joined by laser beam radiation. For example, Japanese Unexamined Patent Application Publication No. 2019-51535 discloses a technique to radiate a laser beam with specific intensities to respective regions on a welding surface, namely a main region and an auxiliary region adjacent to the main region.

SUMMARY

In a manufacturing process of an automobile part (for example, an automobile body), metal forming such as press forming may be performed using a material called a tailored blank. A tailored blank is made of steel plates with different characteristics, for example, materials, and thicknesses joined by butt welding. Since one piece of tailored blank includes materials with different characteristics arranged in different portions thereof, use of a tailored blank enables improved productivity, weight reduction of a formed part, and so on.

In an actual manufacturing process of a tailored blank, there may be a gap between steel plates arranged abutting each other, and/or a radiation position to which a laser beam is radiated may be deviated from a target position.

If there is a gap between steel plates, part of a laser beam passes through the gap and causes a loss of an output power of the laser beam. This results in a shortage of molten metal that contributes joining of the steel plates and thus causes a possibility of insufficient joining of the steel plates.

If a radiation position of a laser beam deviates from a target position, of the deviation also causes a possibility of insufficient joining of steel plates. For example, when steel plates of different thicknesses are joined in a manufacturing process, it is conceivable that the center of a laser beam is radiated on a thicker steel plate. In this case, a beam radiation condition including an output power and a beam radiation area (a beam radiation region) is expected to be set to sufficiently penetrate the thicker steel plate. However, if the radiation position deviates toward a thinner steel plate, there is an excess of energy radiated to the steel plate. This may cause a lack of molten metal and thus result in insufficient joining of the steel plates. In contrast, it is also conceivable that the center of laser beam is radiated on the thinner steel plate, and, for this purpose, a beam radiation condition is expected to be set to sufficiently penetrate the thinner steel plate. In this case, if the radiation position deviates toward the thicker steel plate, there is a short of energy radiated to the steel plate. This may produce an insufficient penetration depth in the thicker steel plate and thus result in insufficient joining of the steel plates.

It is desirable that the present disclosure provides a manufacturing method of a tailored blank and a manufacturing method of an automobile part that enable sufficient joining of steel plates regardless of a gap between the steel plates and/or deviation of a radiation position.

One aspect of the present disclosure provides a manufacturing method of a tailored blank including a first steel plate and a second steel plate to be joined by butt welding. In the manufacturing method, the first steel plate and the second steel plates are butt welded with a laser beam. The laser beam comprises, on a beam radiating surface, a first region located in a central portion, a second region surrounding the first region, a third region surrounding the second region, and a fourth region surrounding the third region. The laser beam has a power density q1 in the first region, a power density q2 in the second region, a power density q3 in the third region, and a power density q4 in the fourth region. The power density q1, the power density q2, the power density q3, and the power density q4 satisfy a relationship of $q1>q2>q3>q4$.

Such a method enables sufficient joining of steel plates regardless of a gap between the steel plates or deviation of a radiation position.

The first steel plate may have a thickness different from a thickness of the second steel plate. Such a method enables sufficient joining of steel plates regardless of deviation of a radiation position.

The laser beam may be radiated at an output power P1 in the first region, an output power P2 in the second region, an output power P3 in the third region, and an output power P4 in the fourth region. The output power P1, the output power P2, the output power P3, and the output power P4 may satisfy a relationship $P1>P2$ and a relationship $P1<P3, P4$.

The laser beam may be radiated at an output power P1 in the first region, an output power P2 in the second region, an output power P3 in the third region, and an output power P4 in the fourth region. The difference between a ratio of the output power P3 to the output power P1 (P3/P1) and a ratio of the output power P4 to the output power P1 (P4/P1) may be 2.6 or less. According to such a method, it is easy form a gradual power density distribution across a beam radiation area. Thus, steel plates can be sufficiently joined regardless of a gap between the steel plates or deviation of a radiation position.

One aspect of the present disclosure provides a manufacturing method of an automobile part to be produced by forming of a tailored blank. In the method, the tailored blank is produced by the aforementioned manufacturing method of a tailored blank. Such a method enables sufficient joining of steel plates regardless of a gap between the steel plates or deviation of a radiation position.

BRIEF DESCRIPTION OF THE DRAWINGS

Embodiments of the present disclosure will be described hereinafter by way of example with reference to the accompanying drawings, in which:

FIG. 3 is a table listing a roll of each region in a case where a radiation region of a laser beam is divided into three regions, and in a case where the radiation region is divided into four regions;

DETAILED DESCRIPTION OF EXEMPLARY EMBODIMENTS

1. Manufacturing Method of Tailored Blank

Figure 1:
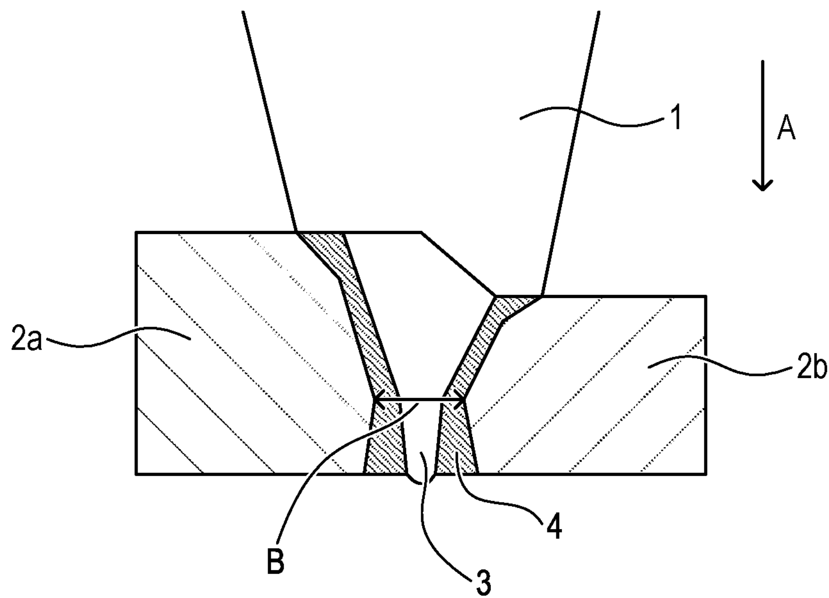
FIG. 1 illustrates a manufacturing method of a tailored blank by way of a cross-sectional view of steel plates.

As illustrated in FIG. 1, in a manufacturing method of a tailored blank according to one embodiment of the present disclosure, a first steel plate 2*a* and a second steel plate 2*b* are joined by butt welding with a laser beam 1 of, for example, a fiber laser. In the present embodiment, each of the first steel plate 2*a* and the second steel plate 2*b* is a zinc plated steel plate, and has a thickness different from the other steel plate.

Figure 2:
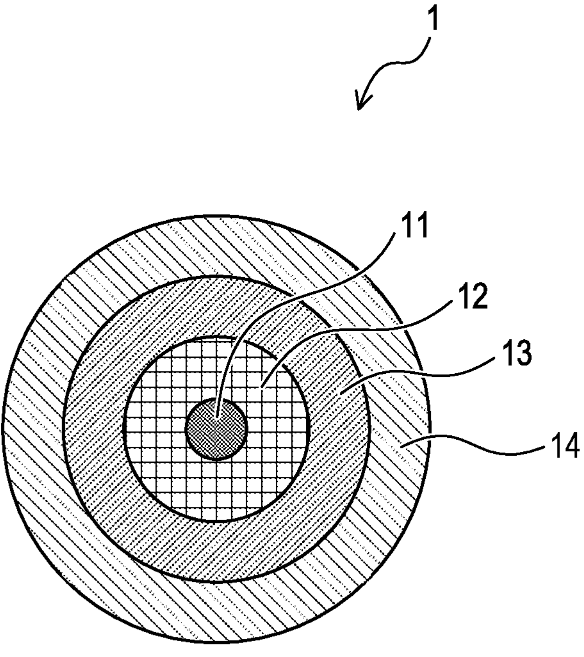
FIG. 2 is a diagram of a first to a fourth region of a laser beam.

As illustrated in FIG. 2, the laser beam 1 comprises, on a beam radiating surface, a first region 11 located in a central portion, a second region 12 surrounding the first region 11, a third region 13 surrounding the second region 12, and a fourth region 14 surrounding the third region 13. The term "beam radiating surface" mentioned herein means the surfaces of steel plates irradiated with the laser beam 1. For example, as illustrated in FIG. 1, if the laser beam 1 is radiated perpendicular to the first steel plate 2*a* and the second steel plate 2*b*, the beam radiating surface is a cross section perpendicular to a radiation direction of the laser beam 1, that is, a cross section perpendicular to a direction A illustrated in FIG. 1. The laser beam 1 comprising such radiation regions can be formed by splitting a laser beam with a diffractive optical element.

The first region 11 has a circular shape while each of the second region 12 to the fourth region 14 has an annular shape.

The laser beam 1 has a power density q1 in the first region 11, a power density q2 in the second region 12, a power density q3 in the third region 13, and a power density q4 in the fourth region 14. The power density q1, the power density q2, the power density q3, and the power density q4 satisfy a relationship of $q1>q2>q3>q4$. The term "power density" means an output power of the laser beam 1 per area in one region.

As described above, in actual manufacturing of tailored blanks, there may be a gap between steel plates arranged abutting each other, and/or a radiation position at which a laser beam is radiated may be deviated from a target position. In such cases, there is a possibility that steel plates cannot be sufficiently joined.

To enable stable welding of steel plates regardless of a gap between the steel plates, it is desirable to widen a beam radiation area to some extent and thereby increase the amount of molten metal so that the gap can be quickly filled with the molten metal. Moreover, to deal with deviation of a radiation position, it is desirable to achieve a relatively large molten width. As indicated by an arrow B in FIG. 1, the molten width refers to the width of a melt pool 4 formed around a keyhole 3.

However, according to a study made by the inventors of the present disclosure, adjusting power density distribution of a laser beam is extremely difficult in a case where a laser beam has only two or three radiation regions as in the above-described Japanese Unexamined Patent Application Publication No. 2019-51535. The reason is that it is technically difficult to form a molten width of a desired size while such a large beam radiation area is provided. A power density refers to an output power of a laser beam per area.

As illustrated in FIG. 3, in a case where a laser beam has, for example, only three radiation regions, a power density q1 in a first region located in a central portion, a power density q2 in a second region surrounding the first region, and a power density q3 in a third region surrounding the second region are adjusted to q1>q2>q3. During the adjustment, the power density q1 in the first region is adjusted so as to achieve a desired penetration depth. The power density q2 in the second region is adjusted so as to assist penetration in the central portion and to achieve a desired molten width. The power density q3 in the third region is adjusted so as to provide a sufficient amount of molten metal.

However, in order to achieve a desired molten width by means only of the power density q2 in the second region, the power density q2 has to be increased to a considerable extent. There is usually a limit to the total output power of a laser beam due to the design of a laser. For a widened beam radiation area, a large output power is required to heat the entire beam radiation area. Accordingly, in order to increase the power density q2 in the second region, it is necessary to reduce the power density q3 in the third region. This makes the difference large between the power density q2 in the second region and the power density q3 in the third region. Such a large difference in the power densities renders a melt pool unstable, thereby causing a spatter, for example.

Figures 4A, 4B, 4C:
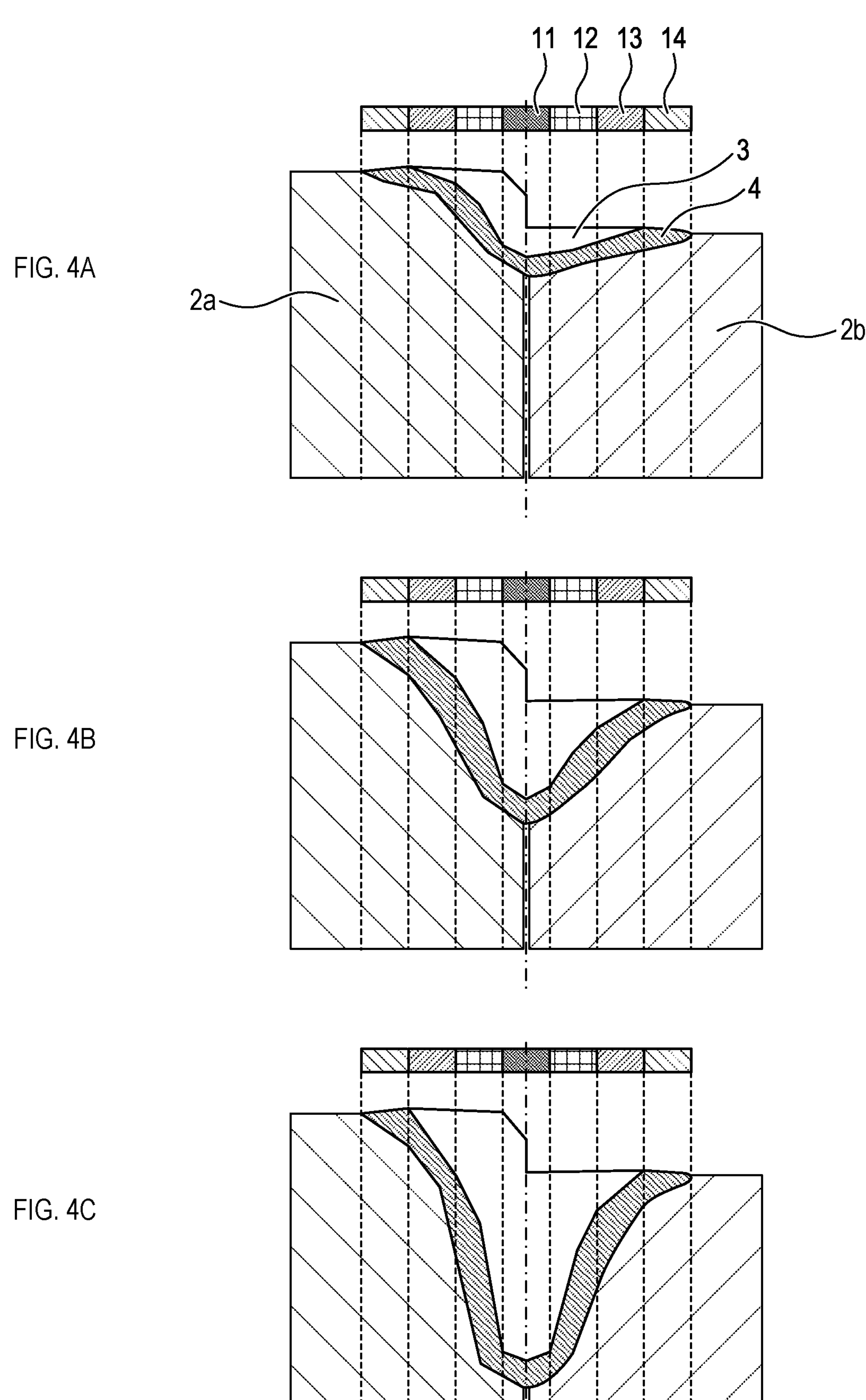
FIG. 4A is a cross-sectional view of a welded portion, illustrating a simulation result of radiation of the laser beam in FIG. 2 in a stage immediately after an initiation of radiation.
FIG. 4B is a cross-sectional view of the welded portion, illustrating the simulation result of radiation of the laser beam in FIG. 2 in a stage in which a penetration depth reaches 50%.
FIG. 4C is a cross-sectional view of the welded portion, illustrating the simulation result of radiation of the laser beam in FIG. 2 in a stage in which the penetration depth reaches 75%.
Figures 5A, 5B, 5C:
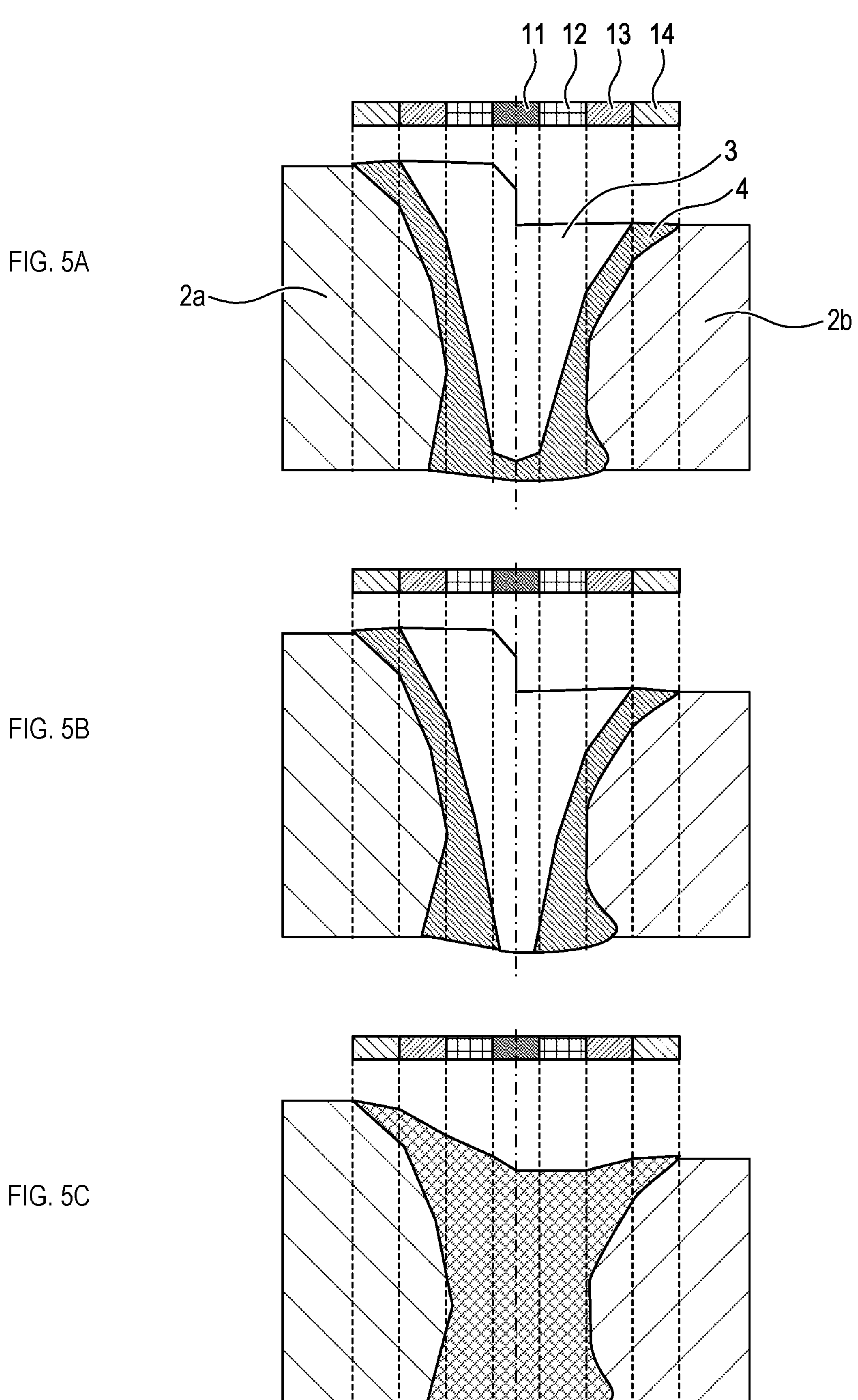
FIG. 5A is a cross-sectional view of the welded portion, illustrating the simulation result of radiation of the laser beam in FIG. 2 in a stage immediately before a keyhole penetrates steel plates.
FIG. 5B is a cross-sectional view of the welded portion, illustrating the simulation result of radiation of the laser beam in FIG. 2 in a stage after the keyhole penetrates the steel plates.
FIG. 5C is a cross-sectional view of the welded portion, illustrating the simulation result of radiation of the laser beam in FIG. 2 in a stage in which a melted portion has solidified.

In contrast, in the manufacturing method according to one embodiment of the present disclosure, the radiation region of the laser beam 1 is divided into four regions having respective power densities. This enables fine adjustment to power density distribution as illustrated in FIGS. 4A to 4C.

Specifically, the power density q1 in the first region 11, the power density q2 in the second region 12, the power density q3 in the third region 13, and the power density q4 in the fourth region 14 are adjusted to q1>q2>q3>q4. The power density q1 in the first region 11, located in the central portion, is adjusted so as to achieve a desired penetration depth. The power density q2 in the second region 12 is adjusted so as to assist penetration in the central portion and stabilize the keyhole 3. The power density q3 in the third region 13 surrounding the second region 12 is adjusted so as to achieve a desired molten width. The power density q4 in the outermost fourth region 14 is adjusted so as to provide a sufficient amount of molten metal.

This enables adjustment to the power densities such that a sufficient molten width is achieved by a relatively low power density in the third region 13 while penetration in the central portion is assisted by a relatively high power density in the second region 12. As a result, it is possible to reduce the difference between the power density q3 in the third region 13 and the power density q4 in the fourth region 14. This prevents the above-described melt pool 4 from becoming unstable. Thus, the melt pool 4 is stabilized and the welding quality is improved.

The inventors of the present disclosure performed butt welding with the laser beam 1 comprising the first region 11, the second region 12, the third region 13, and the fourth region 14 having respective power densities described above (hereinafter referred to as "example of the present embodiment"). The width of each of the annular second region 12 to fourth region 14, that is, the difference between the inner diameter and the outer diameter of each region was adjusted to be the same as the diameter of the first region 11.

Figure 6:
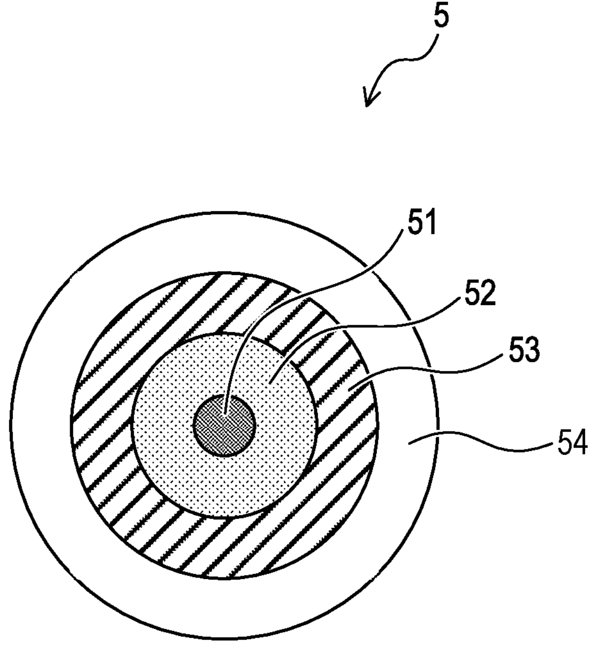
FIG. 6 is a diagram of a laser beam in a case where a power density in the fourth region is zero.
Figures 7A, 7B, 7C:
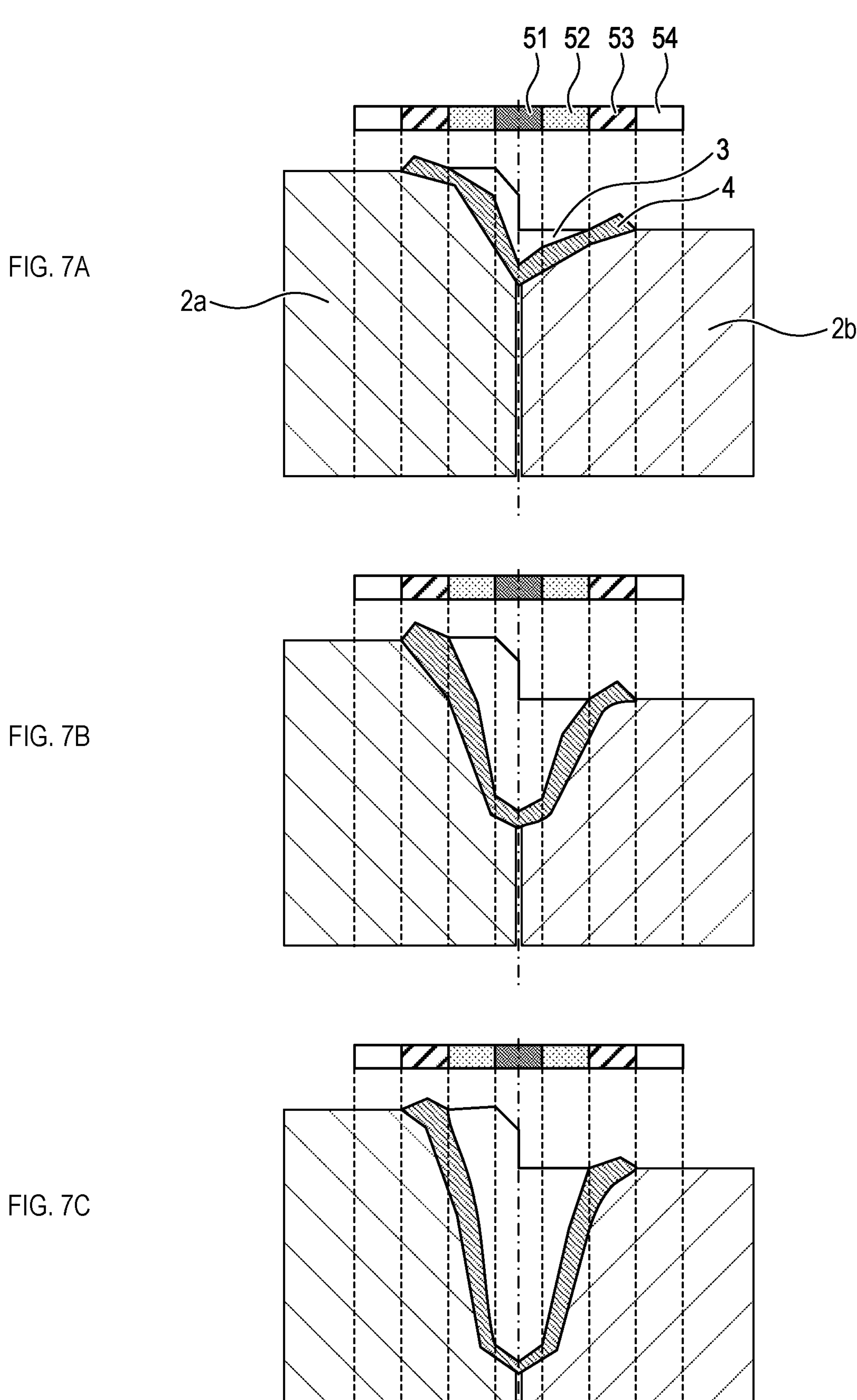
FIG. 7A is a cross-sectional view of a welded portion, illustrating a simulation result of radiation of the laser beam in FIG. 6 in a stage immediately after an initiation of radiation.
FIG. 7B is a cross-sectional view of the welded portion, illustrating the simulation result of radiation of the laser beam in FIG. 6 in a stage in which a penetration depth reaches 50%.
FIG. 7C is a cross-sectional view of the welded portion, illustrating the simulation result of radiation of the laser beam in FIG. 6 in a stage in which the penetration depth reaches 75%.
Figures 8A, 8B, 8C:
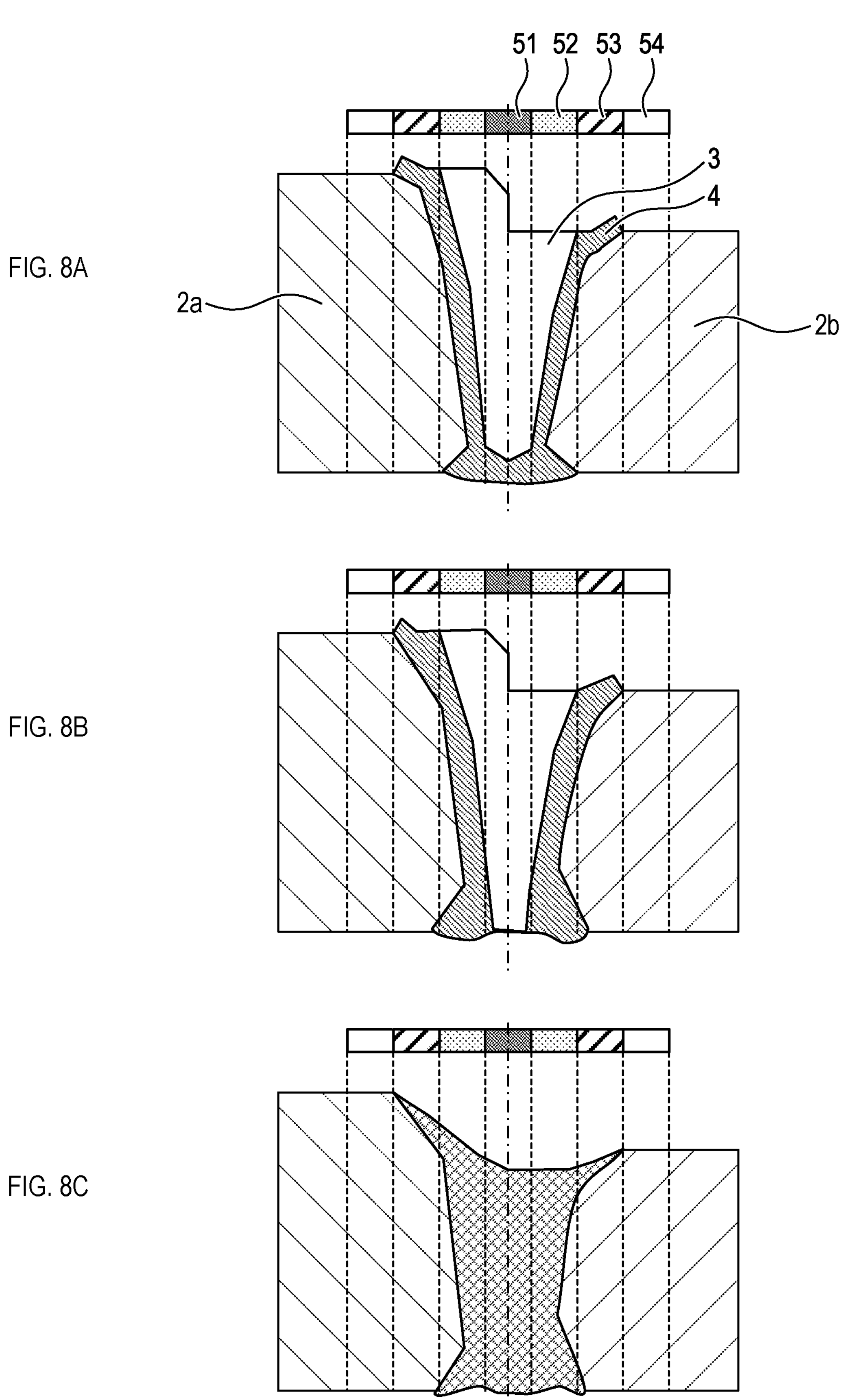
FIG. 8A is a cross-sectional view of the welded portion, illustrating the simulation result of radiation of the laser beam in FIG. 6 in a stage immediately before a keyhole penetrates steel plates.
FIG. 8B is a cross-sectional view of the welded portion, illustrating the simulation result of radiation of the laser beam in FIG. 6 in a stage after the keyhole penetrates the steel plates.
FIG. 8C is a cross-sectional view of the welded portion, illustrating the simulation result of radiation of the laser beam in FIG. 6 in a stage in which a melted portion has solidified.
Figure 9:
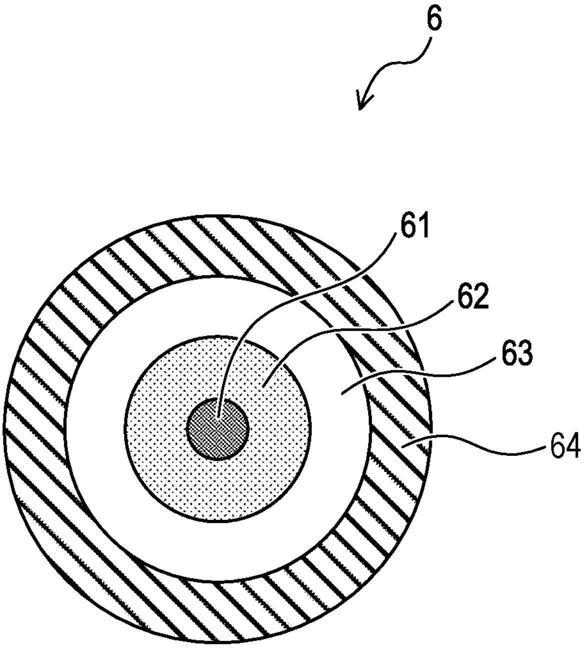
FIG. 9 is a diagram of a laser beam in a case where a power density in the third region is zero.
Figures 10A, 10B, 10C:
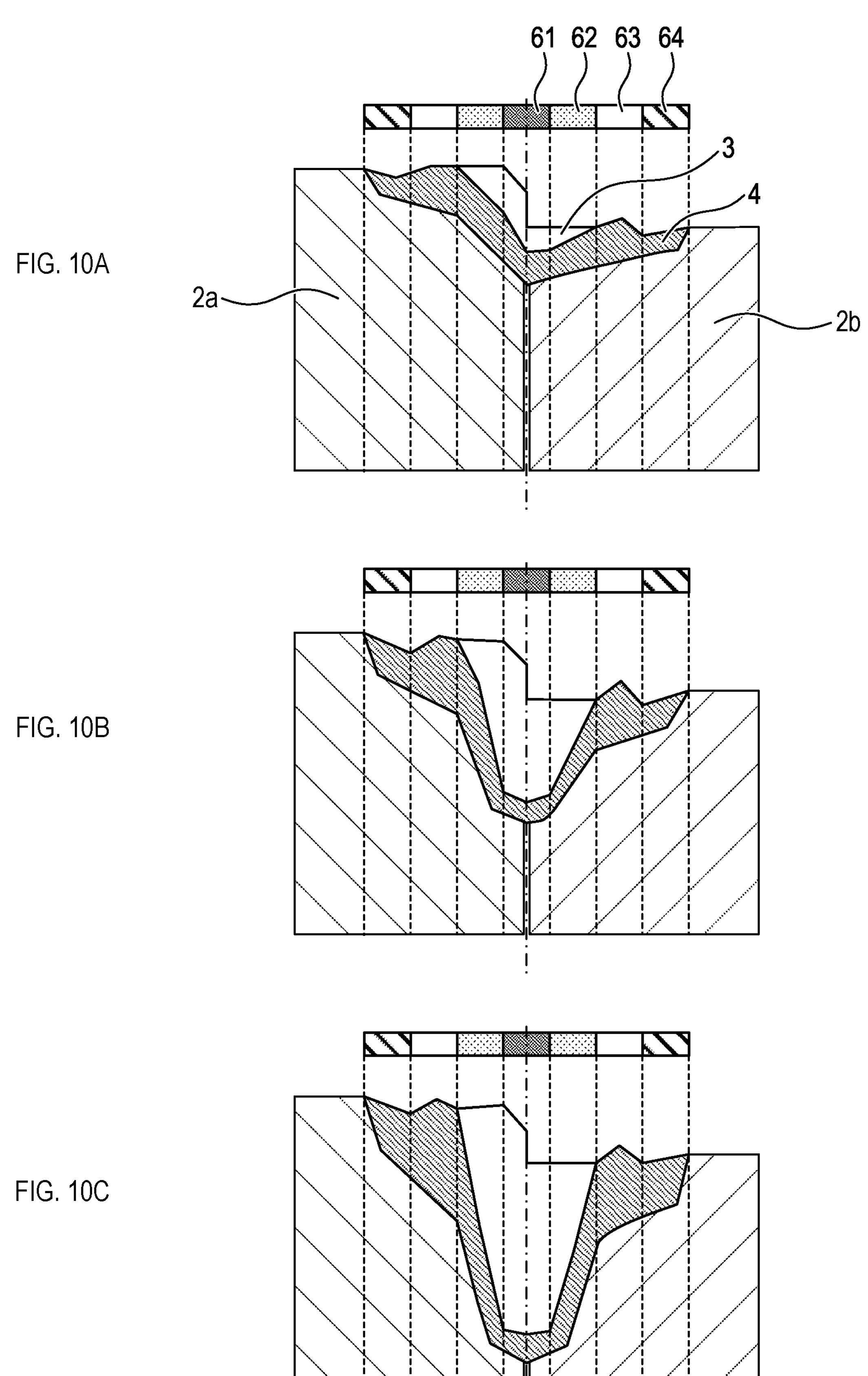
FIG. 10A is a cross-sectional view of a welded portion, illustrating a simulation result of radiation of the laser beam in FIG. 9 in a stage immediately after an initiation of radiation.
FIG. 10B is a cross-sectional view of the welded portion, illustrating the simulation result of radiation of the laser beam in FIG. 9 in a stage in which a penetration depth reaches 50%.
FIG. 10C is a cross-sectional view of the welded portion, illustrating the simulation result of radiation of the laser beam in FIG. 9 in a stage in which the penetration depth reaches 75%.
Figures 11A, 11B, 11C:
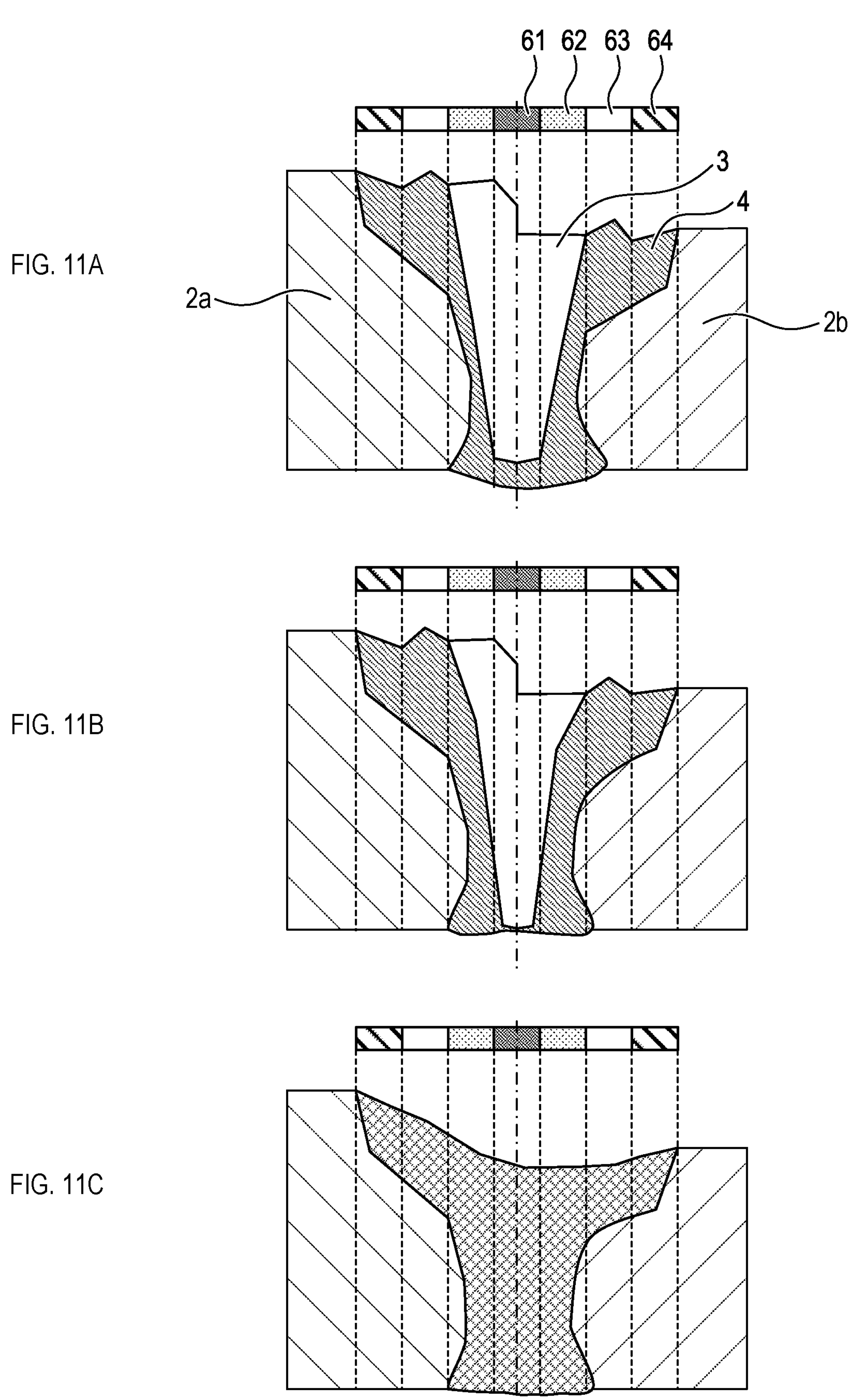
FIG. 11A is a cross-sectional view of the welded portion, illustrating the simulation result of radiation of the laser beam in FIG. 9 in a stage immediately before a keyhole penetrates steel plates.
FIG. 11B is a cross-sectional view of the welded portion, illustrating the simulation result of radiation of the laser beam in FIG. 9 in a stage after the keyhole penetrates the steel plates.
FIG. 11C is a cross-sectional view of the welded portion, illustrating the simulation result of radiation of the laser beam in FIG. 9 in a stage in which a melted portion has solidified.

As illustrated in FIG. 6, the inventors also performed butt welding in a similar manner with a laser beam 5 comprising a first region 51, a second region 52, a third region 53, and a fourth region 54 (Comparative Example 1). In this example, the power density in the fourth region 54 was changed to zero. As illustrated in FIG. 9, the inventors further performed butt welding in a similar manner with a laser beam 6 comprising a first region 61, a second region 62, a third region 63, and a fourth region 64 (Comparative Example 2). In Comparative Example 2, the power density in the third region 63 was changed to zero.

In addition, the inventors analyzed progress of the welding in the three examples by simulation. Simulation results are illustrated in FIGS. 4A to 4C and FIGS. 5A to 5C (example of the present embodiment), FIGS. 7A to 7C and FIGS. 8A to 8C (Comparative Example 1), and FIGS. 10A to 10C and FIGS. 11A to 11C (Comparative Example 2).

In the example of the present embodiment, a wide gradual keyhole and a wide melt pool were formed, and the first steel plate 2*a* and the second steel plate 2*b* were successfully sufficiently joined despite the gap therebetween and/or the deviation of the radiation position.

In contrast, as illustrated in FIG. 6, in Comparative Example 1 in which the power density in the fourth region 54 was changed to zero, the steel plates 2*a*, 2*b* were not sufficiently joined even though the gap or the deviation of the radiation position was small. This is probably because the keyhole 3 was narrow and thus the achieved molten width was not wide enough.

In comparison with Comparative Example 1, as illustrated in FIG. 9, in Comparative Example 2 in which the power density in the third region 63 was changed to zero, the steel plates 2*a*, 2*b* were successfully sufficiently joined as long as the gap or the deviation of the radiation position was small. Nevertheless, a permissible range of a gap and a permissible range of deviation of a radiation position were not as broad as those in the example of the present embodiment. This is probably because the keyhole 3 was narrow and thus the achieved molten width was not wide enough.

According to an analysis conducted by the inventors, an effective way to reduce the difference between the power density q3 in the third region 13 and the power density q4 in the fourth region 14 is to reduce the difference between an output power of a laser beam in the third region 13 and an output power in the fourth region 14. Specifically, it is preferable, where a laser beam is radiated at an output power P1 in the first region 11, an output power P2 in the second region 12, an output power P3 in the third region 13, and an output power P4 in the fourth region 14, that the difference between the ratio of the output power P3 to the output power P1 (P3/P1) and the ratio of the power output P4 to the output power P1 (P4/P1) is 2.6 or less.

Moreover, according to the analysis conducted by the inventors, it is preferable, where a laser beam is radiated at an output power P1 in the first region 11, an output power P2 in the second region 12, an output power P3 in the third region 13, and an output power P4 in the fourth region 14, that the output power P1, the output power P2, the output power P3, and the output power P4 satisfy a relationship P1>P2 and a relationship P1<P3, P4.

Furthermore, according to the analysis conducted by the inventors, it is preferable that the sum of the widths of the first region 11 to the fourth region 14 is greater than five times a gap between the first steel plate 2*a* and the second steel plate 2*b*. In a case where the sum of the widths of the first region 11 to the fourth region 14 is greater than five times a gap between the first steel plate 2*a* and the second steel plate 2*b*, it is possible to form a wide molten width and thus to further broaden the permissible range of a gap and the permissible range of deviation of the radiation position. It should be noted that a gap between steel plates mentioned herein indicates the width of the narrowest portion of a gap created between steel plates.

It is possible to suitably use tailored blanks manufactured in accordance with the method described hereinabove for manufacturing automobile parts such as automobile bodies.

2. Effects

According to the above-described manufacturing method, formation of a gradual power density distribution is facilitated across the beam radiation area while a beam radiation area is increased. Thus, it is possible to sufficiently join steel plates regardless of a gap between the steel plates or deviation of the radiation position. This also improves the quality of welding.

Especially, in a case where the thickness of a first steel plate and the thickness of a second steel plate are different, deviation of a radiation position may prevent sufficient joining of the steel plates as described above. However, according to the above-described manufacturing method, formation of a gradual power density distribution is facilitated across the beam radiation area while a wide beam radiation area is provided. Thus, it is possible to achieve a relatively wide molten width. As a result, the steel plates can be sufficiently joined regardless of deviation of a radiation position.

In addition, zinc plated steel plates, when melted, produce zinc vapor since the boiling point of zinc is lower than the melting point of steel plates. As a laser beam is scanned on steel plates, the steel plates are irradiated first with the outer radiation region of the laser beam and then with the inner radiation region, and thereby the temperature of the steel plates increases. In a case, for example, where there are only three radiation regions, the difference in the power densities of the second region and the third region increases as described above, thereby causing a rapid temperature change to the zinc plated steel plates. As a result, steam of zinc is suddenly produced, blowing molten metal, for example, and thereby making a hot liquid (specifically, a molten material) more likely to be unstable.

However, the above-described manufacturing method enables a gradual power density distribution to be formed between radiation regions, thereby enabling a gradual increase in the temperature of zinc plated steel plates as scanning of a laser beam proceeds. Accordingly, zinc plating is first vaporized and removed before energy necessary to melt steel plates is introduced. Thus, the aforementioned manufacturing method can also inhibit the above-described destabilization of liquid which is specific to zinc plated steel plates.

3. Other Embodiments

An embodiment of the present disclosure has been described hereinabove. The present disclosure, however, should not be limited to the above-described embodiment and may be carried out in variously modified manners.

(3*a*) In the above-described manufacturing method, the difference between the first steel plate and the second steel plate of the tailored blank is only the thickness. However, the first steel plate and the second steel plate may have other different characteristics. For example, the first steel plate and the second steel plate may be made of different materials and/or may have different strengths.

(3*b*) In the above-described manufacturing method, the first steel plate and the second steel plate are both zinc plated steel plates. The first steel plate and the second steel plate may be made of other materials.

(3*c*) The first region 11 to the fourth region 14 may have other shapes different from those mentioned in the above-described manufacturing method. For example, the first region 11 may have a rectangular shape, and each of the second region 12 to the fourth region 14 may have a rectangular shape with a rectangular hole. For another example, the first region 11 may have an oval shape, and each of the second region 12 to the fourth region 14 may have an oval shape with an oval hole. In addition, there may be a gap between some of the first region 11 to the fourth region 14.

(3*d*) The type of a laser used for welding is not limited to a fiber laser, which is used in the above-described embodiment. Examples of the laser include CO2 lasers and YAG lasers.

(3*e*) The above-described manufacturing method of a tailored blank can be suitably employed for manufacturing automobile parts. The method can also be employed for manufacturing other types of parts.

(3*f*) Functions of one component in the above-described embodiments may be achieved by two or more components, and a function of two or more components may be achieved by one component. Some of the components of the above-described embodiments may be omitted. At least part of the configurations of the above-described embodiments may be added to or replaced with other configurations of the above-described embodiments.

(3*g*) The present disclosure can be achieved in various forms including the above-described manufacturing method, a program that controls operations of a computer in accordance with the manufacturing method, and a non-transitory tangible storage medium storing the program.

What is claimed is:

1. A manufacturing method of a tailored blank including a first steel plate and a second steel plate to be joined by butt welding, the method comprising butt welding the first steel plate and the second steel plate with a laser beam, the laser beam comprising, on a beam radiating surface, a first region located in a central portion, a second region surrounding the first region, a third region surrounding the second region, and a fourth region surrounding the third region, and the laser beam having a power density q1 in the first region, a power density q2 in the second region, a power density q3 in the third region, and a power density q4 in the fourth region, and the power density q1, the power density q2, the power density q3, and the power density q4 satisfying a relationship of $q1>q2>q3>q4$, wherein a straight line direction extends perpendicular to the laser beam and passes through a center of the laser beam;

wherein each of the second region, the third region, and the fourth region has a corresponding inner boundary line, has a corresponding outer boundary line, and has a width extending between the corresponding inner boundary line and the corresponding outer boundary line;

wherein each of the second region, the third region, and the fourth region has a width the same as a width of the first region in the straight line direction;

wherein the laser beam is radiated at a total output power P1 in the first region, a total output power P2 in the second region, a total output power P3 in the third region, and a total output power P4 in the fourth region; and wherein the total output power P1, the total output power P2, the total output power P3, and the total output power P4 satisfy a relationship of $P1>P2$ and a relationship of $P1<P3, P4$.

2. The method according to claim 1, wherein the first steel plate has a thickness different from a thickness of the second steel plate.

3. A manufacturing method of a tailored blank including a first steel plate and a second steel plate to be joined by butt welding, the method comprising butt welding the first steel plate and the second steel plate with a laser beam, the laser beam comprising, on a beam radiating surface, a first region located in a central portion, a second region surrounding the first region, a third region surrounding the second region, and a fourth region surrounding the third region, and the laser beam having a power density q1 in the first region, a power density q2 in the second region, a power density q3 in the third region, and a power density q4 in the fourth region, and the power density q1, the power density q2, the power density q3, and the power density q4 satisfying a relationship of $q1>q2>q3>q4$, wherein a straight line direction extends perpendicular to the laser beam and passes through a center of the laser beam;

wherein each of the second region, the third region, and the fourth region has a corresponding inner boundary line, has a corresponding outer boundary line, and has a width extending between the corresponding inner boundary line and the corresponding outer boundary line;

wherein each of the second region, the third region, and the fourth region has a width the same as a width of the first region in the straight line direction;

wherein the laser beam is radiated at a total output power P1 in the first region, a total output power P2 in the second region, a total output power P3 in the third region, and a total output power P4 in the fourth region, and wherein a difference between a ratio of the total output power P3 to the total output power P1 and a ratio of the total output power P4 to the total output power P1 is 2.6 or less.

4. A manufacturing method of an automobile part to be produced by forming of a tailored blank, the tailored blank being produced by a manufacturing method of a tailored blank including a first steel plate and a second steel plate to be joined by butt welding, the method comprising butt welding the first steel plate and the second steel plate with a laser beam, the laser beam comprising, on a beam radiating surface, a first region located in a central portion, a second region surrounding the first region, a third region surrounding the second region, and a fourth region surrounding the third region, and the laser beam having a power density q1 in the first region, a power density q2 in the second region, a power density q3 in the third region, and a power density q4 in the fourth region, and the power density q1, the power density q2, the power density q3, and the power density q4 satisfying a relationship of $q1>q2>q3>q4$, wherein a straight line direction extends perpendicular to the laser beam and passes through a center of the laser beam;

wherein each of the second region, the third region, and the fourth region has a corresponding inner boundary line, has a corresponding outer boundary line, and has a width extending between the corresponding inner boundary line and the corresponding outer boundary line;

wherein each of the second region, the third region, and the fourth region has a width the same as a width of the first region in the straight line direction;

wherein the laser beam is radiated at a total output power P1 in the first region, a total output power P2 in the second region, a total output power P3 in the third region, and a total output power P4 in the fourth region; and wherein the total output power P1, the total output power P2, the total output power P3, and the total output power P4 satisfy a relationship of $P1>P2$ and a relationship of $P1<P3, P4$.

5. The manufacturing method of a tailored blank according to claim 1, wherein a sum of each of the widths of the first region, the second region, the third region, and the fourth region is greater than five times a minimum gap between the first steel plate and the second steel plate.

* * * * *